(No Model.)
W. N. WHITELEY.
DRIVE CHAIN.
No. 542,952.            Patented July 16, 1895.
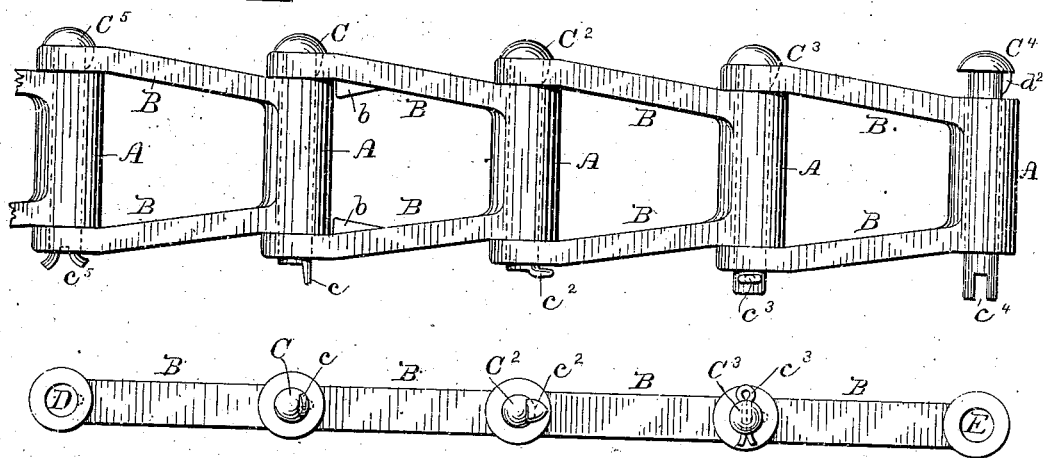
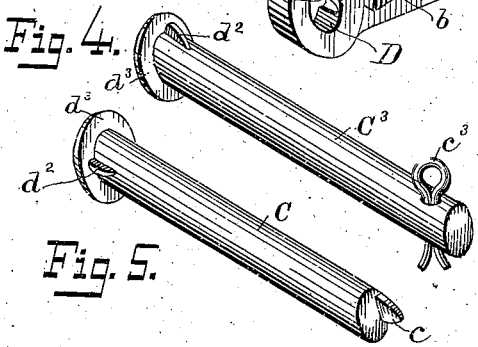
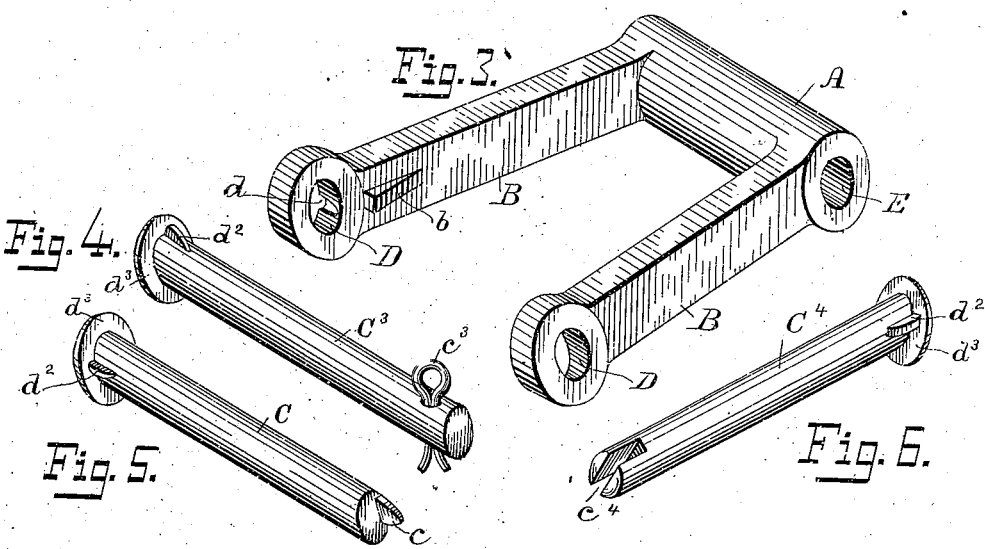
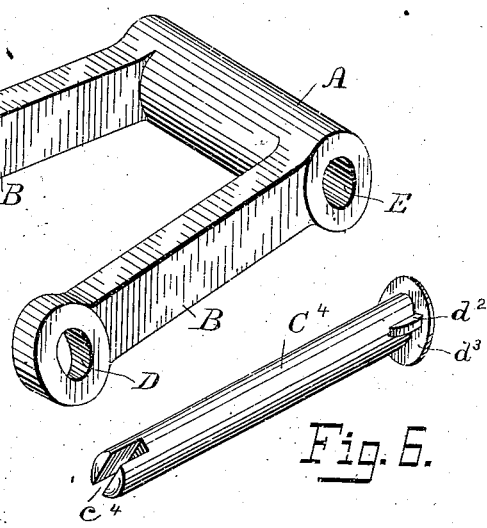
Witnesses:
Oscar E. Perrigo
F. B. Furniss
Inventor
William N Whitely

UNITED STATES PATENT OFFICE.

WILLIAM N. WHITELEY, OF SPRINGFIELD, OHIO.

DRIVE-CHAIN.

SPECIFICATION forming part of Letters Patent No. 542,952, dated July 16, 1895.

Application filed December 17, 1885. Serial No. 185,923. (No model.)

*To all whom it may concern:*

Be it known that I, WILLIAM N. WHITELEY, a citizen of the United States, residing at Springfield, in the county of Clark and State of Ohio, have invented certain new and useful Improvements in Driving-Chains, of which the following is a full, clear, and exact description, reference being had to the accompanying drawings, attached hereto and forming a part of this specification.

My invention relates to that class of chains known as "driving-chains" for harvesters and other purposes; and it consists in forming a chain of detachable links, each a counterpart of the others, pivoted and held together by transverse pins suitably secured in their places by means hereinafter more particularly described.

My chain is an improvement in that special class of driving-chains in which the links may be disconnected when in line with each other and without turning them into a position at an angle to each other.

In the drawings, Figure 1 is a view of the flat side of my chain. Fig. 2 is an edge view of the same. Fig. 3 is a perspective view of one of the links. Figs. 4, 5, and 6 are perspective views of three forms of transverse pins employed in my chain.

Similar letters refer to like parts in the several views.

Each link is a counterpart of the other and consists of a longitudinally-perforated cross-bar A, having formed upon it, nearly at right angles, two side bars or jaws B B, expanded sufficiently to receive the cross-bar of the next link and perforated transversely with holes D D of like diameter as the hole E through the length of the cross-bar A.

At one side of the hole D, through one of the jaws B, is formed a slot $d$, (see Fig. 3,) to receive a corresponding rib or web $d^2$ on the transverse pins C.

Upon the inside of the side bars or jaws B may be formed the shoulders $b\ b$, which rest against the cross-bar A of the next link, thus preventing any looseness that might arise from the transverse pins C not fitting the holes D and E perfectly. The shoulders $b\ b$ also form guides for conducting the sprockets into their places in the center of each link if necessary.

To connect the several links so as to form a chain they may be placed in a straight line, as shown in Figs. 1 and 2, the jaws B B embracing the cross-bar A of the next link, in which position the transverse pins C, $C^2$, $C^3$, $C^4$, and $C^5$ may be introduced and secured, as hereinafter described. The transverse pins C are constructed with the usual form of head $d^3$, under which and extending along a short distance on the body of the pin is a rib or web $d^2$, which, when the pin is in place, engages in the slot $d$ at one side of the hole D in the jaws B, thus preventing the pin from turning in the jaws B B and causing the wearing-surface to extend over the whole length of the pin within the cross-bar A, by which means the pins and jaws wear much longer than they would if the pins were allowed to turn freely in the jaws B B.

I have devised several methods of holding the pin C in its place. In the first (represented in Fig. 4, and at $C^5$, Figs. 1 and 2) the pin has a transverse hole through it in which the spring-key $c^3$ of the usual form is inserted. The second form is shown at Fig. 5 and C, Figs. 1 and 2, in which the pin has formed upon it a projecting lip $c$. The pin is placed in position as shown and the lip $c$ bent over by a blow of the hammer, as seen at $C^2$. The third form is shown in Fig. 6 and at $C^4$, Figs. 1 and 2, in which the pin has a slot or groove cut in it similar to the slot in a screw-head, except that it is much wider and deeper, as seen at $c^4$. The pin is placed in position and the two parts formed by the slot bent outward, as shown at $c^5$, by a blow from the peen of a hammer or by a cold-chisel. In each of these instances the pin is provided with a projecting arm or arms which are conveniently movable relative to the pin to hold or to release it. In Fig. 4 the arm or arms are formed by the spring-pin $c^3$, which may be entirely separated from the transverse pin. In Figs. 5 and 6 the arm or arms are integral with the pin and it is conveniently movable by bending into line with or into a position at right angles to the pin, in the former of which positions the pin is released and may be removed to uncouple the chain, and in the latter of which the pin is securely held, so as to prevent unintentional uncoupling.

In practice the chain may be made up with all the pins of either one of these forms or the chain principally composed of links held together by pins of the form shown in Figs. 5 and 6, and a few links provided with pins of the form shown in Fig. 4 for convenience of connecting or disconnecting.

I do not confine myself to either of these forms, but propose to use either, as may seem most desirable, or to rivet the end of the pin in the usual manner, according to the use to which the chain is put or the circumstances under which it is used.

Having thus described my invention, what I claim as new, and desire to secure by Letters Patent, is—

1. A driving chain composed of counterpart links detachable when in line with each other, each link consisting of a perforated end bar and two perforated side bars adapted to receive between them the end bar of the next link, in combination with transverse pins, each pin being provided with a head, the remainder of the pin being adapted to pass freely through both the perforations of the side bars and of the end bar when the links are in line, the pin being provided with a fastening device at the end opposite the head, and with a rib at the end next the head, and the corresponding side bar having a slot for said rib, substantially as described.

2. A drive chain link provided with parts as follows: a perforated cross-bar to engage the wheel sprocket; projecting from said cross-bar, two side arms or jaws to receive between them the cross-bar of the adjacent link; transverse perforations in said arms near their extremities; an enlargement or slot in one of said perforations; projections $b, b$, on the inner sides of said arms, to resist the thrust of the adjoining link; combined with a coupling pin provided at one end with a rib or feather to fit into the enlargement or slot, and provided at the other end with a fastening device to prevent displacement or withdrawal of said pin.

WILLIAM N. WHITELEY.

Witnesses:
OSCAR E. PERRIGO,
F. B. FURNISS.